March 5, 1968 W. F. PORTER 3,372,013
APPARATUS FOR FORMING FIBERS
Filed June 7, 1965 2 Sheets-Sheet 1

WILLIAM F. PORTER
INVENTOR.

BY *John Kenneth Weir*

ATTORNEY

March 5, 1968 W. F. PORTER 3,372,013
APPARATUS FOR FORMING FIBERS
Filed June 7, 1965 2 Sheets-Sheet 2

WILLIAM F. PORTER
INVENTOR.

BY John Kenneth Wise
ATTORNEY

United States Patent Office 3,372,013
Patented Mar. 5, 1968

3,372,013
APPARATUS FOR FORMING FIBERS
William F. Porter, Roselle, Ill., assignor to United States
Gypsum Company, a corporation of Delaware
Filed June 7, 1965, Ser. No. 461,734
8 Claims. (Cl. 65—15)

ABSTRACT OF THE DISCLOSURE

Fiberizing apparatus including a rotor having a peripheral wall with a plurality of rows of orifices, the rotor being mounted on a shaft disposed at an angle to the vertical with the inner surface of the lower portion of the wall exposed upwardly beneath the bushing of a forehearth. The melt to be fiberized falls directly from the bushing of the forehearth onto the upwardly exposed inner surface of the rotor wall, over the orifices. Additionally, a current of gas of varying intensity may be impinged on the falling stream to oscillate the stream across the width of the orifice band.

This invention relates to the forming of glass fibers and has for an object the provision of an improved process and apparatus for their high speed and economical production.

The fiberization of glass with a perforate centrifugal rotor begins with the formation of primary fibers which may be reduced in diameter by a high temperature, high velocity blast of gases surrounding the fiberizing rotor. The ultimate size of the fibers is dependent to a large extent upon the size of the primary fibers formed by the rotor, and this in turn, is dependent upon the quantity of glass which is distributed to the fiber forming orifices.

Rotors are manufactured with a large number of orifices arranged across their side walls in a number of rows. To obtain satisfactory production from such a rotor, it is important that substantially all of the orifices be supplied with an equal quantity of glass, otherwise those orifices which receive a large quantity of glass tend to make large diameter fibers, those receiving a small quantity of glass make much finer fibers and those which receive no glass make no fibers at all. Thus, a uniform distribution of the glass to the orifices is of utmost importance if commercial production of uniformly sized fibers is to be realized.

Glass melt is often supplied to a fiberizing rotor by directing a stream down a hollow vertical shaft to a distributor device and thence to the perforated rotor wall. Commonly the distributor is centrally located within the rotor and revolves as a part of it so that an imperfection caused by the distributor always appears in the same sector of the rotor. In this way a damaged distributor can cause an unbalanced rotor by supplying locally excessive quantities of melt and the excessive heat carried by the extra glass can reduce the rotor life. Further, because the distributor is within the rotor, modification of the distribution pattern within the rotor cannot ordinarily be made while the rotor is in operation.

In the forming of glass fibers from molten glass, especially when employing a centrifugal perforated spinner, viscosity control, and, therefore, temperature control, is extremely important. It is desirable, therefore, that after the temperature of the molten glass has been adjusted in a forehearth, it not be permitted or required to contact distributors, guiding devices such as troughs and like elements in its passage from the forehearth to the spinning rotor. It is also desirable in forming felted articles such as batts from the fibers that the spinner be mounted on an axis which is nearly horizontal. Despite the potential advantages of this process, an apparatus to utilize these principles has not heretofore been known. It is an object of this invention, therefore, to provide an improved apparatus for the spinning of glass fibers. A further object of this invention is to provide an improved apparatus for the manufacture of glass fiber felted products.

It is a still further object of this invention to provide an apparatus wherein a temperature stabilized glass melt is transferred directly to the perforate area of a substantially horizontally mounted centrifugal spinner.

It is a still further object of this invention to provide a process for the manufacture of glass fibers wherein the temperature of the glass is stabilized and the glass is then transferred directly to the perforate area of a rotating centrifuge and spun into fibers.

It is an object of this invention to provide a process and apparatus for the distribution of glass melt over the interior of a fiberizing rotor. It is the further object of this invention to provide a melt distribution apparatus and method which perform well on streams of greatly differing capacity.

It is a further object of this invention to provide a freely falling stream of glass melt having in effect an acircular cross section.

It is a still further object of the invention to provide a process and apparatus in which the group of fiber forming orifices supplied with melt can be varied as to size and location on the rotor while the rotor is in operation.

These and other advantages and objects will become apparent from the description in the specification and drawings.

In general, these objects are achieved by providing a forehearth of such construction and capacity that a uniform volume of glass melt is discharged at substantially constant temperature and viscosity. Discharge from the forehearth is by means of a freely falling stream having a vertical axis, beneath which is positioned a substantially horizontally mounted centrifugal spinner with the axis of its shaft slightly offset from the axis of the falling stream so that the glass melt can be deposited within the centrifuge immediately on or adjacent to the fiber forming orifices. Rotation of the centrifuge forces the melt through the orifices where a blast of hot gases changes their direction, attenuates them and carries them downstream into a blow room where they are collected in a suitable manner.

In one embodiment, the vertical stream of glass forming material is deflected to a larger number of fiberizing orifices by small puffs of gas and the distribution is controlled by the intensity, duration and spacing of these directing puffs. This produces substantially uniform distribution of the glass over the interior of the fiberizing rotor.

Referring now to the drawings.

Figure 1:
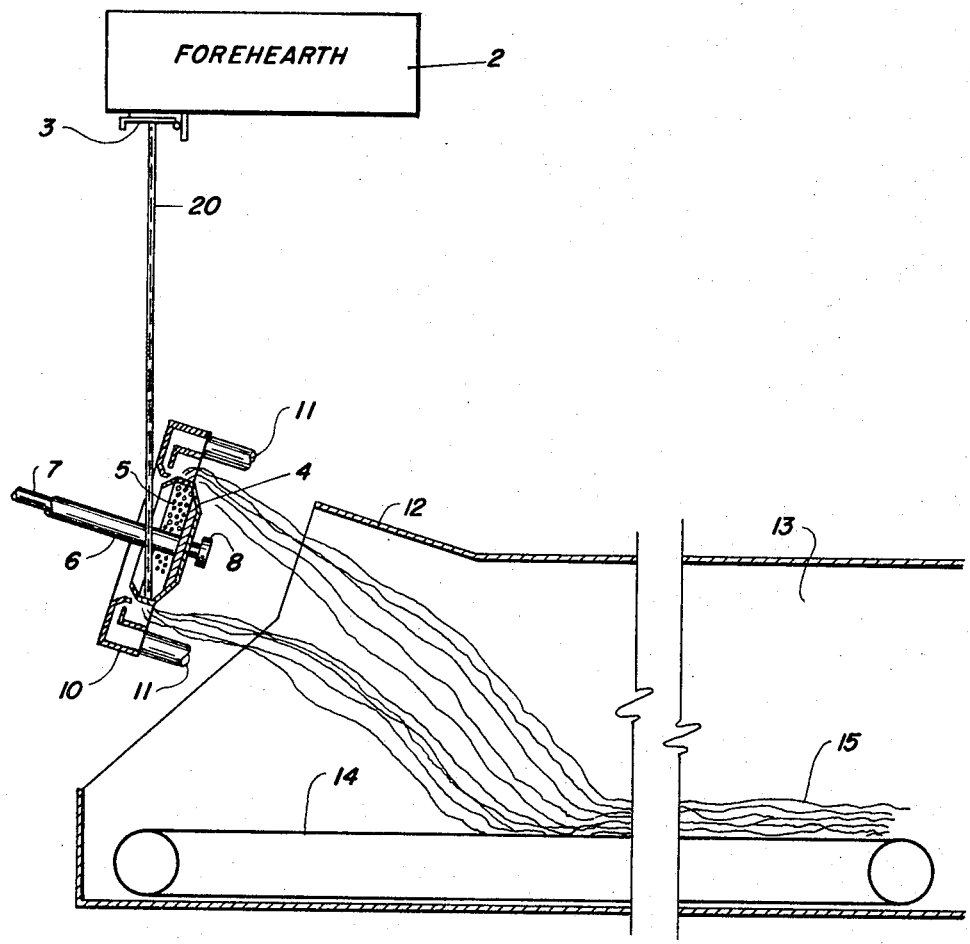
FIGURE 1 shows a general arrangement of the over-all apparatus.

Referring now to FIGURE 1 of the drawings, there is illustrated a diagrammatic presentation, partly in section, of an embodiment of the apparatus according to this invention. A supply of molten glass not shown is established and maintained as a source of material for the forehearth 2. The forehearth serves as a surge tank to reduce variations in the rate of flow from the main glass supply and also carefully adjusts the temperature of the glass, so that it will have a proper viscosity for the forming into fibers. A bushing 3 on the forehearth is adapted to discharge the glass melt in a vertical free-falling stream 20 at a desired flow rate.

Positioned below the bushing 3 with its shaft 6 offset slightly to one side is a fiber forming rotor 4 carrying on its sidewall a plurality of rows of fiber forming orifices 5. This rotor is mounted on a hollow shaft 6 at an angle of 45 to 55 degrees or more from the vertical and is positioned beneath the bushing 3 so that the vertical stream of glass melt will impinge on the inside of the rotor 4 on an area radially adjacent to the fiber forming orifices 5. A binder feed pipe 7 is passed through the hollow rotor shaft 6 and terminates down stream from the rotor in a binder sprayer 8. Surrounding the rotor 4 is a burner ring 10 which is supplied with gas and air through a plurality of inlets 11.

The rotor is designed for rapid rotation so that a force of about 1,000 times the force of gravity is developed on the glass adjacent the inner edges of the orifices. The speed of the rotation to develop this force is dependent upon the diameter of the rotor but for a rotor of about 12″ in diameter rotational speeds of 2,000 to 2,500 r.p.m. are employed.

The operating speeds are dependent in part upon the temperature and viscosity the glass melt and by the alloys from which the rotor is constructed. With a high strength alloy operating at a reduced temperature, speeds of up to 3,000 r.p.m. may be desirable to fiberize the more viscous glass. Conversely, with glasses of lower viscosity or with fiberizing orifices which have worn to a larger diameter, lower rotational speeds down to about 1,500 r.p.m. are useful.

The burner may be designed to operate at super-atmospheric pressure with a gas-air supply pressure of from 1 to about 10 pounds per square inch and preferably about 5 to about 7 pounds per square inch so that the combustion products are discharged therefrom at a temperature of 2200 to about 2500 degrees Fahrenheit and at a velocity of about 1100 to about 1500 feet per second or more. The temperature and velocity of the combustion products may be controlled by adjusting the ratio of fuel to oxidant in the mixture fed to the burner and also by changing the pressure at which these gases are supplied.

Adjacent the rotor 4 and substantially coaxial with the shaft 6 is a blow room inlet 12 which forms a passage to the blow room 13 where the fibers are collected. Forming the bottom of the blow room 13 is a forminous pick-up belt 14 for accumulating the fibers into a felted product 15.

Figures 2, 3, 4, 6:
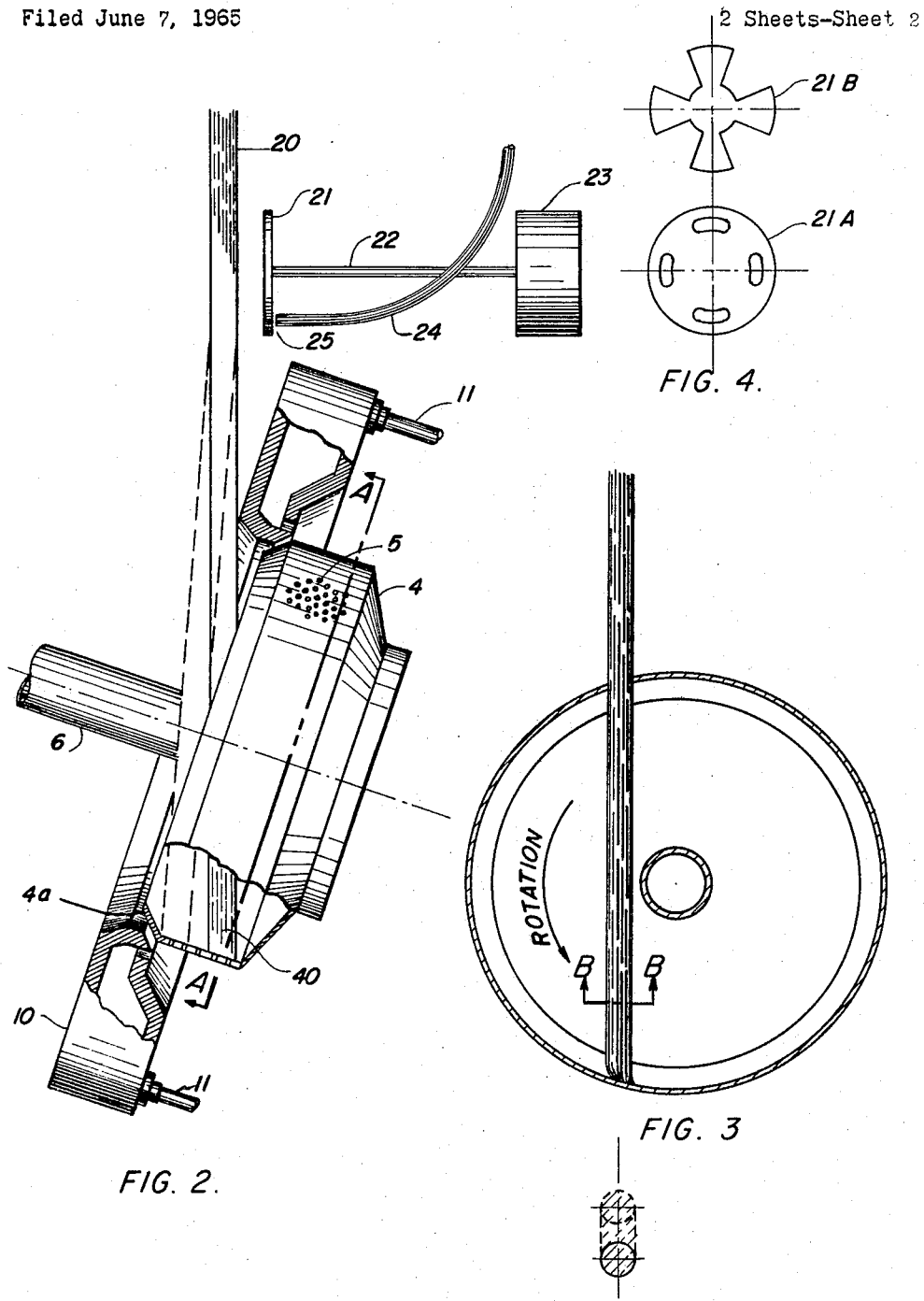
FIGURE 2 shows an enlarged view of the rotor portion of the apparatus with a pneumatic distributor in place.
FIGURE 3 is a section of the rotor along the section line A—A of FIGURE 2.
FIGURE 4 illustrates alternate configurations for a gas modulator wheel.
FIGURE 6 is a cross section of the glass stream taken on the section line B—B of FIGURE 3.

Referring to FIGURE 2, there is shown an enlargement of a portion of FIGURE 1, including the glass stream 20 descending from the bushing to the interior of the rotor 4. A pneumatic deflector is located between the bushing and the rotor and may be conveniently mounted from the burner ring. This deflector consists of an interrupter wheel or chopper 21 mounted on the shaft 22 for rotation by driving means 23. Positioned adjacent the interrupter wheel is a conduit 24 from a source of compressed gas arranged so that the rotation of the interrupter wheel produces intermittent puffs of the gass against the stream of molten glass. The interrupter wheel may, as shown in FIGURE 4, be in the form of a slotted disc 21–A or the device having broad spokes extending from the hub as shown at 21–B or in other convenient form.

In operation, the speed of rotation of the chopper and the number of blades may vary widely but the puffs produced should not be so numerous and closely spaced that the inertia of the glass stream prevents its response. A stream of molten glass flowing at the rate of 600 to 1000 lbs. per hour and having a diameter of ¾″ to 1″ was found to be responsive to 120 puffs per minute.

The deflection of the stream of glass forming material is controlled so that an oscillating motion is imparted to the stream, the oscillations lying in a plane generally parallel to the shaft of the rotor. It is preferable to utilize a gentle current of gas for control so that the stream is deflected through a relatively small arc generally less than about 10 degrees from the vertical.

Figure 5:
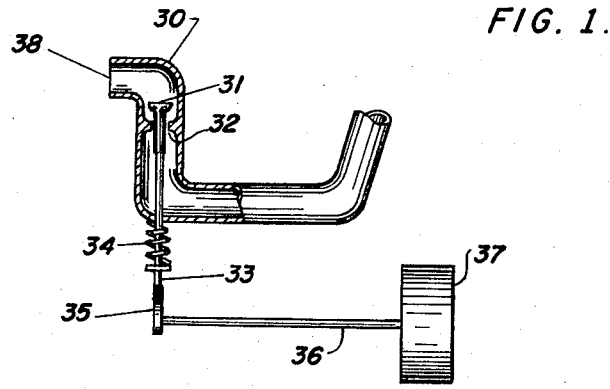
FIGURE 5 illustrates an alternate modulating means.

An alternate embodiment of the stream director is shown partly in section in FIGURE 5 wherein a small poppet valve assembly generally indicated at 30 is provided with a valve 31 cooperating with a valve seat 32 to control the passage of the gaseous medium. A valve stem 33 and valve spring 34 control the position of the valve and its seat. A cam 35 mounted on the shaft 36 is rotated by driving means 37 to periodically open the valve so that a puff of gas may be directed out of the nozzle 38. Other ways of developing the controlled puffs of gas required to deflect the stream will occur to those skilled in the art. Pneumatic and solenoid valves may be used for this purpose. In some installations it may be advantageous to adjust the stream deflector so that a small biasing current of gas is constantly supplied to position the stream.

A continuous current of gas, intermittently directed at the stream of glass melt may also be employed to impart to it the oscillatory movement desired. Thus the nozzle might be adapted to pivot laterally; alternatively a moving vane or damper might be adapted to effect the rhythmic impingement of the directing gas current upon the stream of glass melt.

When forming fibers with the foregoing apparatus, a supply of glass material was melted and transferred at a suitable rate to the forehearth 2 where its temperature was adjusted to a level useful for spinning fibers. The exact temperature was dependent upon the properties and compositions of the glass, and was between 1800 degrees and 2200 degrees Fahrenheit. A stream of glass melt was discharged from the forehearth at from about 500 to about 1500 pounds per hour in a vertical free-falling path. Beneath the bushing on the forehearth was positioned a fiberizing rotor having a diameter of about 12″ and having about 10,000 fiber orifices arranged on its wall in a band about 2″ wide. The rotor was mounted on a shaft at an angle of about 37 degrees from the horizontal and located beneath the stream of glass melt so that the stream deposited glass on those orifices nearest the base of the rotor shown at 40 in FIGURE 2. The glass stream was deposited on the lower quadrant of the rotor preferably on the side which was moving downward as shown in FIGURE 3.

A pneumatic deflector was located as shown in FIGURE 2 and air was supplied to the conduit 24 at 15 pounds per square inch. A chopper wheel 21 and driving means 23 were selected so that less than about 120 pulses per minute were delivered from the nozzle 25 to the glass stream 20. The stream 20 showed surprisingly little inertia and was readily diverted to the position indicated by the dotted lines in FIGURE 2 so that the glass stream deposited melt upon the orifices near the rim of the rotor 4–A. Thus, the deflector without substantially altering the temperature of the glass was able to distribute it in the elongate pattern shown in FIGURE 6 across the interior of the rotor so that all the orifices on the side wall were supplied with a desirable quantity of melt. The acircular pattern illustrated in FIGURE 6 is most difficult to obtain directly in the stream from the forehearth since the surface tension of the glass has a very strong tendency to restrain a freely falling stream in a circular cross section.

Thus, a stream of glass was readily directed to any point across the width of the inside surface of the fiberizing rotor and by varying the frequency and the duration of the puffs, the distribution was controlled easily and accurately. There fas a minimum change in the temperature of the glass as its direction was controlled. Glass streams of greatly different sizes and flow rates were readily controlled and directed over the desired area within the rotor.

It is readily seen, therefore, that the apparatus and process disclosed above provide for the transfer of the molten fiber forming material from the forehearth to the rotor with a minimum of temperature modifying contacts. At the fiberizing rotor it is formed into fibers in a manner which imparts superior felting characteristics to the fibers.

It is understood, of course, that this invention is not to be limited to the particular embodiment shown and described above, since many modifications may be made, and it is contemplated by the appended claims to cover such modifications as fall within the true spirit and scope of this invention.

What is desired to be claimed is:

1. Apparatus for forming fibers comprising a rotor mounted for rotation about an axis and having a peripheral wall with orifices therein, and means for forming a stream of freely falling molten fiber forming material above said rotor, said rotor being positioned with its axis of rotation at a substantial angle to the vertical and with the inner surface of the lower portion of said peripheral wall upwardly exposed beneath said stream forming means to receive such molten fiber forming material directly from such stream on said inner surface over said orifices.

2. Apparatus for forming fibers as in claim 1 wherein said peripheral wall is formed with orifices arranged over a band of substantial width, as measured parallel to said axis of rotation, and means intermediate said stream forming means and said rotor to impart oscillating motion to such stream across said band.

3. Apparatus for forming fibers as in claim 2 wherein said means intermediate said stream forming means and said rotor comprises pneumatic means for directing a modulated current of gas against such stream.

4. Apparatus for forming fibers as in claim 3 wherein said pneumatic means comprises a gas directing nozzle, a modulating element associated with said nozzle to form periodic variations in said current and timing means for spacing said variations.

5. Apparatus for forming fibers as in claim 1 wherein said rotor is mounted on a shaft, said shaft being disposed at an angle of at least 45° from the vertical and extending upwardly from said rotor.

6. The apparatus of claim 4 wherein the modu'ating element comprises an apertured disc adapted to present apertures and intermediate solid portions alternately to said gas current.

7. The apparatus of claim 4 including a conduit to supply gas to said nozzle and wherein said modulating element comprises a valve in said gas conduit.

8. Apparatus for forming fibers as in claim 5, including a fiber receiving chamber, an inlet to said chamber, said inlet being aligned with said rotor, and means to sweep fibers from said rotor into said chamber in a direction parallel to said axis of rotation.

References Cited

UNITED STATES PATENTS

| | | | |
|---|---|---|---|
| 3,022,538 | 2/1962 | Setterberg | 65—14 X |
| 3,059,454 | 10/1962 | Kleist | 65—14 |
| 3,233,989 | 2/1966 | Stalego | 65—14 X |
| 3,265,477 | 8/1966 | McCoppin | 65—6 X |
| 3,265,483 | 8/1966 | Garrison et al. | 65—6 |

DONALL H. SYLVESTER, *Primary Examiner.*

R. L. LINDSAY, *Assistant Examiner.*